United States Patent [19]

Dorrance et al.

[11] 4,110,726
[45] Aug. 29, 1978

[54] NAVIGATION SYSTEM AND METHOD FOR DETERMINING THE POSITION OF AN OCEAN MINING SHIP

[75] Inventors: William Thomas Dorrance; William Richard Wilson, both of El Cajon, Calif.

[73] Assignee: General Dynamics Corporation Electronics Division, San Diego, Calif.

[21] Appl. No.: 818,145

[22] Filed: Jul. 22, 1977

[51] Int. Cl.$^2$ ............................................... G01S 5/18
[52] U.S. Cl. .................................... 340/6 R; 340/3 E
[58] Field of Search ............................ 340/2, 3 E, 6 R

[56] References Cited

U.S. PATENT DOCUMENTS

| | | | |
|---|---|---|---|
| 2,910,665 | 10/1959 | Hawkins | 340/2 |
| 3,860,900 | 1/1975 | Scudder | 340/3 E |
| 3,864,662 | 2/1975 | David et al. | 340/3 E |

Primary Examiner—Richard A. Farley
Attorney, Agent, or Firm—Brown & Martin

[57] ABSTRACT

A system for determining the position of a ship in relation to predetermined positions on the ocean floor is disclosed. A plurality of first acoustic addressable transponders and a plurality of second acoustic addressable transponders are respectively located at first and second sets of predetermined positions on the ocean floor. Each of the acoustic transponders transmits an acoustic ranging response and identification signal in response to receipt of an acoustic ranging interrogation signal. First and second buoy communications systems are located on first and second buoys respectively moored to the ocean floor in the vicinity of the first and second pluralities of acoustic transponders. Each buoy communication system includes an acoustic communications devices for transmitting an acoustic ranging interrogation signal to the respective acoustic transponders in its vicinity and for receiving acoustic ranging response and identification signals from such acoustic transponders in response thereto; a buoy RF communications device for transmitting RF signals containing information representative of the respective propagation delays between transmission of the acoustic ranging interrogation signal and receipt of the acoustic ranging response and identification signals from the acoustic transponders; and a buoy RF addressable transponder for transmitting an RF buoy ranging response and identification signal in response to receipt of an RF ranging interrogation signal. A ship communications system located on the ship transmits the RF ranging interrogation signals and receives the RF buoy ranging response and identification signals in response thereto. The ship communications system also transmits command signals. The first and second buoy communications systems each respond to the command signal by transmitting the acoustic interrogation signals to the acoustic transponders. The ship communications system receives the RF signals containing the acoustic propagation delay information. A data processing system processes the received RF signals in relation to the transmitted RF ranging interrogation signals to determine the position of the ship in relation to the first and second sets of predetermined positions on the ocean floor.

4 Claims, 12 Drawing Figures

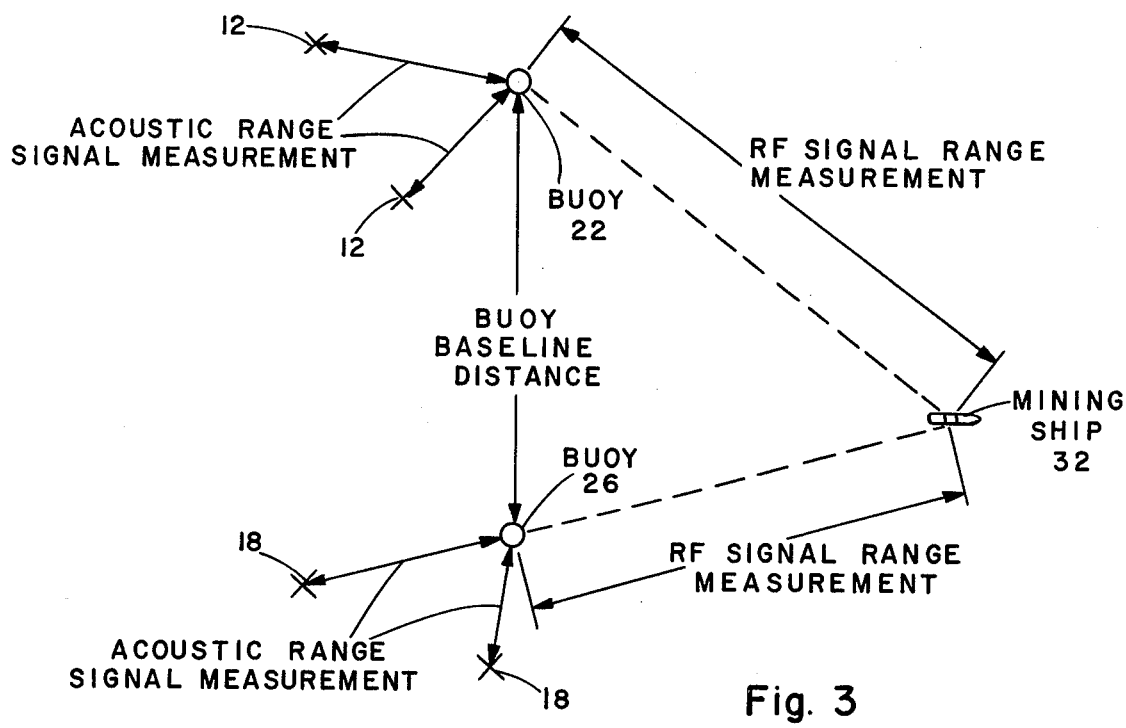
Fig. 3
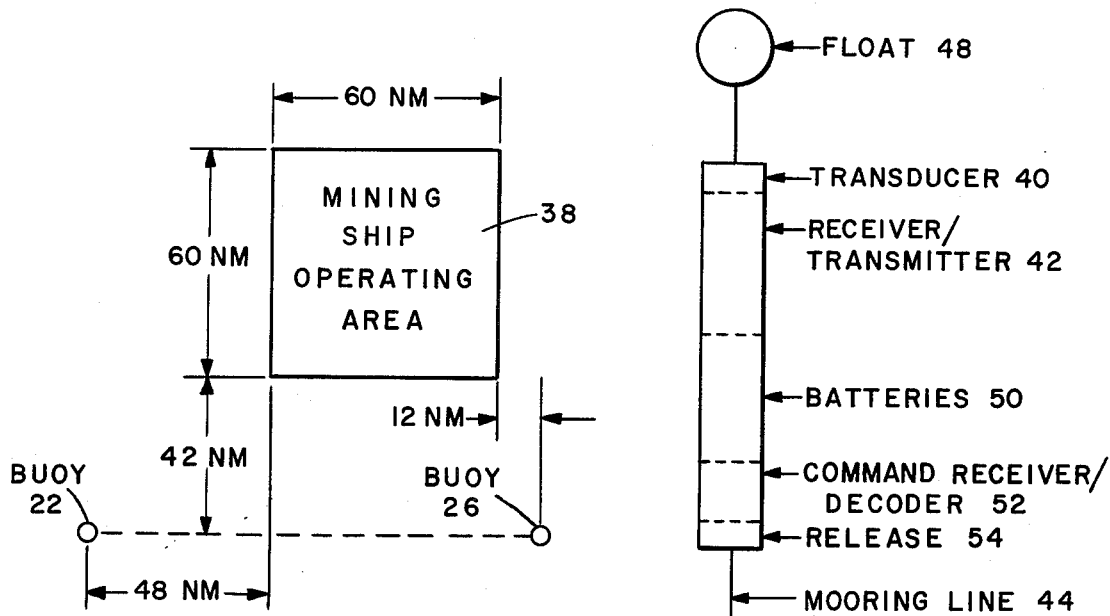
Fig. 4
Fig. 5

NAVIGATION SYSTEM AND METHOD FOR DETERMINING THE POSITION OF AN OCEAN MINING SHIP

BACKGROUND OF THE INVENTION

The present invention generally pertains to distance measurement techniques and is particularly directed to determining the position of a ship in relation to predetermined positions on the ocean floor. The present invention is especially useful for precisely determining the position of a survey vessel or an ocean mining ship.

Throughout the exploration phase of ocean mining it has become clear that precise determination of the positions of survey vessels and mining ships is essential to successful economic exploitation of known nodule deposits. Navigation techniques used to date have provided limited positional accuracy over limited operating areas. However, such is generally understood to be insufficient to ensure operational efficiency of developed mining systems.

Precise determination of ship's position over large operational areas in relation to predetermined positions on the ocean floor enhances the ability to dredge more desirable locations on the ocean floor and to avoid, with greater certainty, hazardous areas which may contain rock outcrops, boulders and other obstructions. Also it decreases the chances of dredging the same floor positions more than once or of leaving large areas undredged. It further decreases the chances of inadvertent claim jumping.

Operational efficiency depends on precise determination of the ship's position over large operating areas, which also directly impacts the economics of the entire mining operation. A total solution requires an independent navigation system which is easily established, reliably operated for years in an unattended mode and simply relocated as necessary, and demands a minimum of operational schedule disruption and personnel training for the operator.

The precision navigation system must provide accurate, repeatable, virtually continuous position location data to support deep sea mining operations. The mining ship operation typically will take place in the open-ocean, hundreds of miles from the nearest land and in water depth of about 15,000 feet.

Electronic distance measurement techniques have been utilized to determine the position of a ship. A transceiver on the ship sends ranging interrogation signals to transponders located at predetermined positions and receives ranging response signals in response thereto. The range of the ship from each transponder is determined by processing the received ranging response signals in relation to the ranging interrogation signals, and the position of the ship in relation to the predetermined positions of the transponders is determined by multilateralization. However, ocean mining operations typically are too far from land to enable determination of the ship's position by multilateralization processing utilizing land based electronic distance measuring equipment.

Few conventional navigational aids are available in ocean mining areas. They are the Navigational Satellite System, the Omega navigation system, and inertial reference systems. None of these systems can meet the required positional accuracy for deep ocean mining surveys and/or operations.

For example, the satellite system provides positional accuracy of only about one-quarter nautical mile and the Omega system is accurate to only about 1 mile.

SUMMARY OF THE INVENTION

In accordance with the method and system of the present invention, the position of a ship in relation to predetermined positions on the ocean floor can be determined by utilizing a combination of electronic and acoustic distance measurement techniques to an accuracy of less than 50 feet.

The present invention provides a system and a method for determining the position of a ship in relation to predetermined positions on the ocean floor over large operating areas. The system includes a plurality of first acoustic addressable transponders and a plurality of second acoustic addressable transponders respectively located at a first and second buoy communications systems located on first and second buoys respectively moored to the ocean floor in the vicinity of the first and second pluralities of acoustic transponders; a ship communications system located on the ship; and a data processing system.

Each of the acoustic transponders transmits an acoustic ranging response and identification signal in response to receipt of an acoustic ranging interrogation signal.

Each buoy communications system includes an acoustic communications device for transmitting an acoustic ranging interrogation signal to the respective acoustic transponders in its vicinity and for receiving acoustic ranging response and identification signals from such acoustic transponders in response thereto; a buoy RF communications device for transmitting RF signals containing information representative of the respective propagation delays between transmission of the acoustic ranging interrogation signal and receipt of the acoustic ranging response and identification signals received from the acoustic transponders; and a buoy RF addressing transponder for transmitting an RF buoy ranging response and identification signal in response to receipt of an RF ranging interrogation signal from the ship.

A ranging interrogation signal includes an address identifying the addressable transponder or group of addressable transponders being interrogated. A ranging response and identification signal includes ranging information that is provided at a fixed interval following receipt of the ranging interrogation signal and also identification information identifying the transponder from which the signal is being provided. In an acoustic ranging response and identification signal, the identification information preferably is provided by such signal having a unique frequency; whereas in an RF ranging response and identification signal, the identification information is encoded and included in such signal following the ranging information.

The ship communications system transmits the RF ranging interrogation signals and receives the RF buoy ranging response and identification signals in response thereto; and also receives the RF signals containing the acoustic propagation delay information. Preferably the ship communications system transmits a command signal, and the buoy communications systems responds to the command signal by transmitting the acoustic ranging interrogation signals.

The data processing system processes the received RF signals in relation to the transmitted RF ranging interrogation signals to determine the position of the ship in relation to the first and second sets of predetermined positions on the ocean floor. The data processing system determines by multilateralization (a) the position of the first buoy in relation to the first set of predetermined positions in response to the received RF signals containing the acoustic propagation delay information respective to the first acoustic transponders, (b) the position of the second buoy in relation to the second set of predetermined positions in response to the received RF signals containing the acoustic propagation delay information respective to second acoustic transponders, and (c) the position of the ship in relation to the first and second buoys in response to the received RF buoy ranging response and identification signals.

BRIEF DESCRIPTION OF THE DRAWING

FIG. 3 illustrates the measurement geometry for determining the position of the ship in relation to the buoys, and for determining the positions on the buoys in relation to the predetermined positions on the ocean floor.

FIG. 4 illustrates the deployment of two buoys in relation to a mining ship operating area.

FIG. 5 is a schematic block diagram of an acoustic transponder included in the system of FIG. 2.

DESCRIPTION OF THE PREFERRED EMBODIMENT

Figure 1:
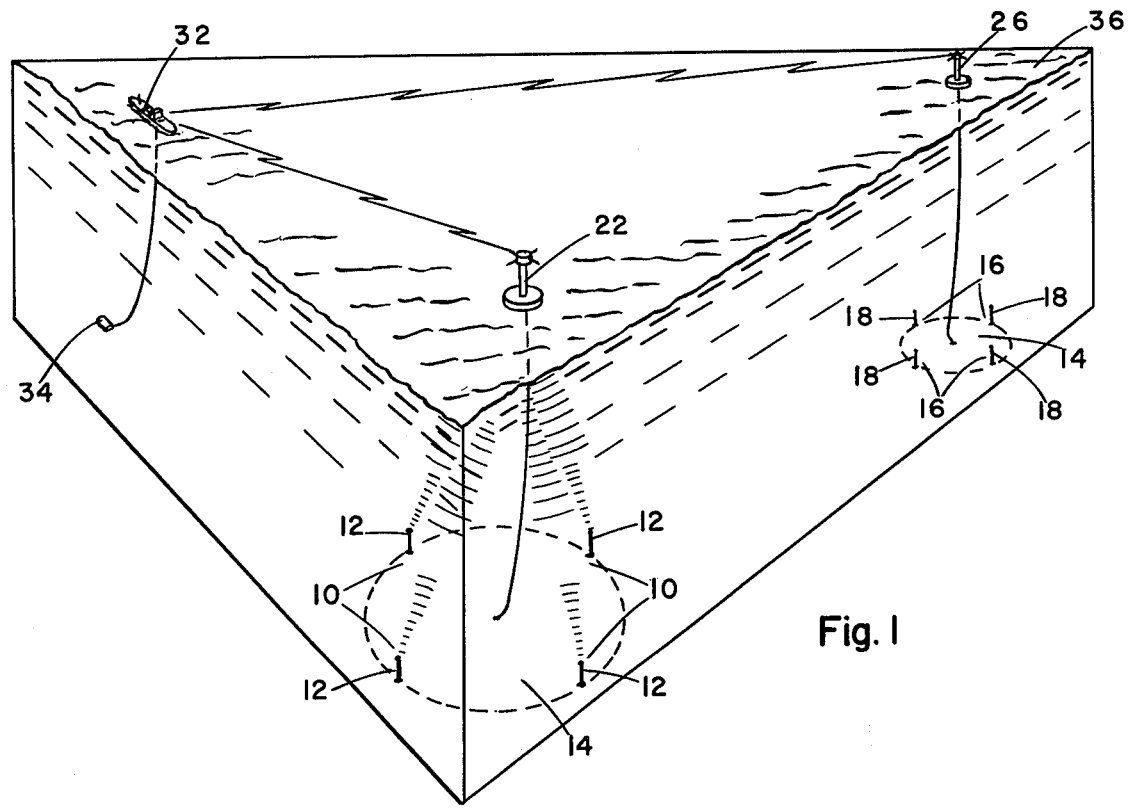
FIG. 1 illustrates the use of the system of the present invention.
Figure 2:
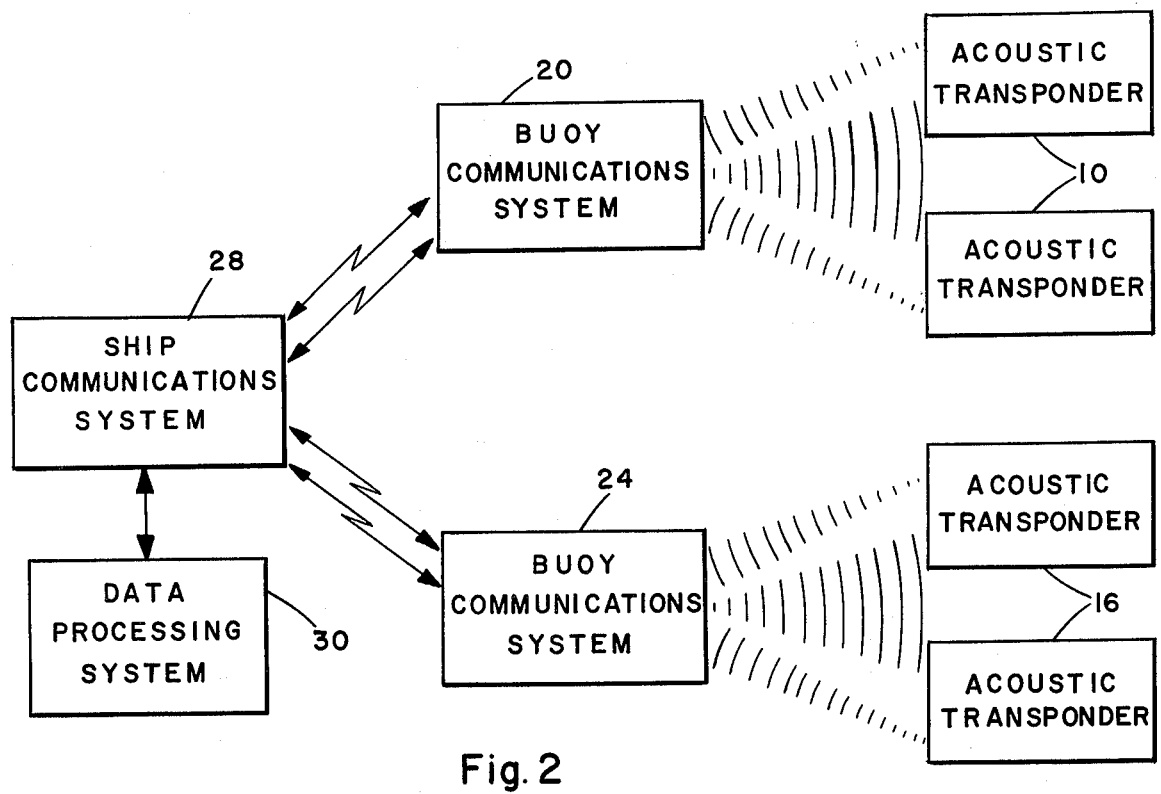
FIG. 2 is a schematic block diagram of the system of the present invention.

Referring to FIGS. 1 and 2, the system of the present invention includes a plurality of first acoustic addressable transponders 10 respectively located at a first set of predetermined positions 12 on the ocean floor 14, and a plurality of second acoustic addressable transponders 16 respectively located at a second set of predetermined positions 18 on the ocean floor 14, a first buoy communications system 20 located on a first buoy 22 moored to the ocean floor 14 in the vicinity of the first acoustic transponders 10, a second buoy communications system 24 located on a second buoy 26 moored to the ocean floor 14 in the vicinity of the second acoustic transponders 16, a ship communications system 28 and a data processing system 30, both of which are located on a ship 32. The ship 32 is illustrated as a mining ship pulling a dredge 34 along the ocean floor 14. The present invention is not concerned with the problem of determining the position of the dredge 34 in relation to the ship 32. This problem is believed to have been solved by members of the ocean mining industry.

The acoustic transponders 10, 16 moored to the ocean floor 14 serve as fixed, stable reference points relative to which the position of the ship 32 can be referenced. These fixed reference points are located outside the mining ship operating area, so that they will not interfere with mining operations. In addition, this geometry optimizes the intersecting range measurements made between the ship 32 and the reference point buoys 22, 26.

The limiting range for an acoustic transponder is approximately 10 nautical miles. Considering an economically reasonable mining ship operating area of 60 by 60 nautical miles, it is not possible to directly measure the acoustic range between the mining ship 32 and the transponders 10, 16 across such distances. Such long range communications are achieved by the use of the moored buoys 22, 26 located on the ocean surface 36 above the acoustic transponders 10, 16 to serve as relay points for range measurements from the ship to the predetermined positions 12, 18 on the ocean floor 14.

As shown in FIG. 3, the baseline distance between the two buoys 22, 26, and also the positions of the buoys 22, 26, are determined in relation to the predetermined positions 12, 18 on the ocean floor 14 by acoustic range signal measurements; and the range from each buoy 22, 26 to the ship 32 is measured by RF range signals, whereby the position of the ship 32 is determined relative to the predetermined positions 12, 18.

FIG. 4 shows the location of the buoys 22, 26 relative to the mining ship operating area 38. Each of the buoys 22, 26 is slack-moored within the area bounded by transponders 12, 18 moored on the ocean floor 14. A single mooring line of scope 1.07 is used. Accordingly, the buoys 22, 26 can move on the surface 36 in response to local wind and ocean currents. The buoy 22, 26 can move freely and will not extend beyond a 9,000 foot radius circle (called a watch circle) under typical environmental conditions found in the Central Pacific. The positions of the buoys 22, 26 relative to the fixed positions 12, 18 of the acoustic transponders 10, 16 on the ocean floor 14 is determined periodically by measuring the distances of a buoy 22, or 26 from each of the four acoustic transponders 12 or 18 which are arranged as shown in FIG. 1. The buoy communications system 20, 24 on each buoy 22, 26 is acoustically active and has the capability to generate a response from the bottom mounted transponders 10, 16 as a function of time or on command in response to a command signal from the ship communications system 28. The nominal configuration of the transponders relative to the buoys is shown in FIG. 1. Each buoy 22, 26 is contained within a 9,000 foot watch circle, given a typical Central Pacific environmental condition of 21 knots surface wind and 2 knots of oceanic current. Moreover, the buoys 22, 26 normally take a long-term "set" because of prevailing ocean currents and surface wind. Consequently, the short-term excursion of each buoy is usually very small.

Referring to FIG. 5, each acoustic transponder 10, 16 includes an acoustic transducer 40 coupled to an electronic receiver/transmitter circuit 42. Each acoustic transponder 10, 16 is moored to the ocean floor 14 by a mooring line 44 and a mooring clump 46. The mooring line 44 is between 100 to 200 feet in length so as to minimize acoustic shadow zones on the ocean floor 14. Each acoustic transponder 14 is tautly positioned vertically with respect to the ocean floor 14 by a float 48. Each acoustic transponder 10, 16 also includes batteries 50 for providing electrical power, a command receiver/decoder device 52 and a release mechanism 54. Upon the batteries 50 approaching their end of life, the command receiver/decoder device 52 responds to an acoustic addressed command signal by causing the release mechanism 54 to release the acoustic transducer 10, 16, thereby allowing the acoustic transducer 10, 16 to float to the ocean surface 36, where it 10, 16 can be recovered for recycling.

The acoustic transponders 10, 16 are deployed in an array of four at each set of predetermined positions 12, 18 on the ocean floor 14. Such an array enables a quadlateralization determination of the position of the buoy 22, 26 when the buoy is at an extreme position in its watch circle. Should any one of the four acoustic transponders 16, 10 fail during the course of multiple year operations a tri-lateralization determination will provide a sufficiently precise determination of buoy position so as not to measurably affect total system accuracy. If necessary, the determination of buoy position can be made with only two acoustic transponders 10, 16 out of the four originally deployed.

Each acoustic transponder 10, 16 provides an acoustic ranging response and identification signal having its own unique frequency at a fixed delay upon recognition of a predetermined acoustic ranging interrogation signal.

Figure 6:
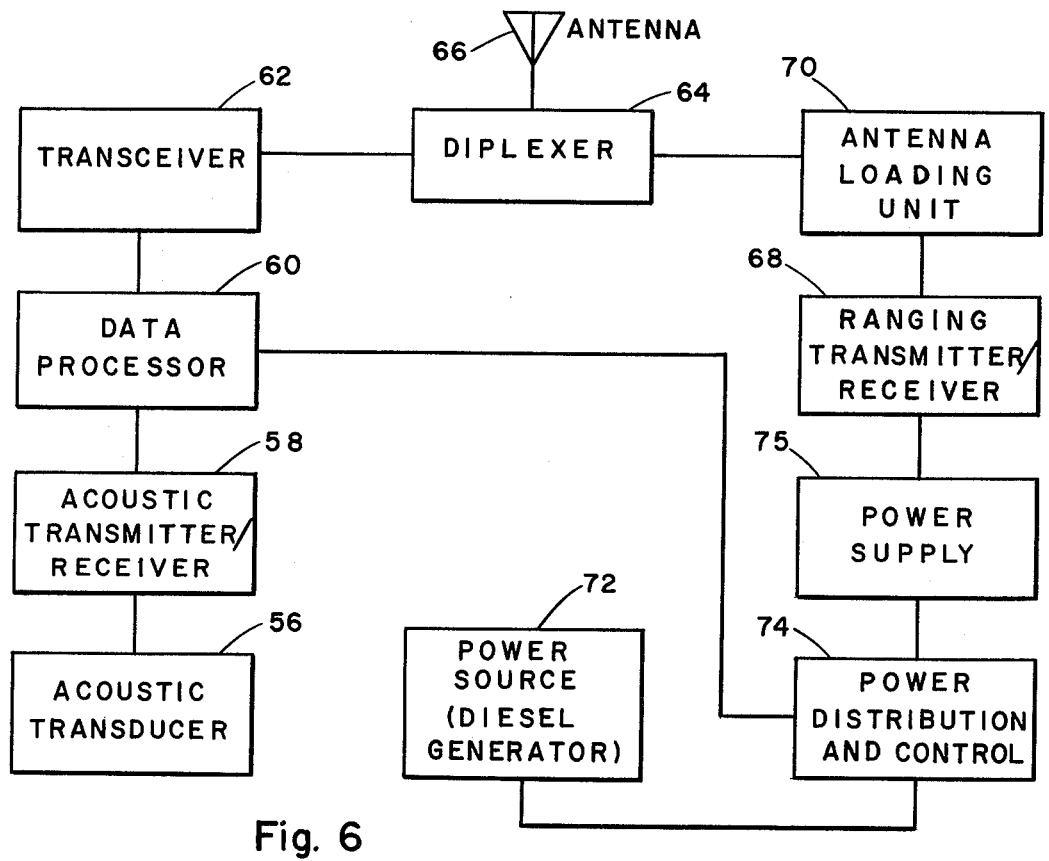
FIG. 6 is a schematic block diagram of a buoy communications system included in the system of FIG. 2.

Referring to FIG. 6, each buoy communication system 20, 24 includes an acoustic transducer 56 and an acoustic transmitter/receiver 58 for transmitting an acoustic ranging interrogation signal to the acoustic transponders 10, 16 and for receiving acoustic ranging response and identification signals from the acoustic transponders 10, 16 in response thereto.

Each buoy communications system 20, 24 further includes a data processor 60 and a transceiver 62 for transmitting RF signals containing information representative of the respective propagation delays between transmission of the acoustic ranging interrogation signal and receipt of the acoustic ranging response and identification signals from the acoustic transponders 10, 16. The acoustic transmitter/receiver 58 includes a four channel acoustic receiver for receiving the acoustic ranging response and identification signals from each of the four acoustic transponders 10, 16 in each array. The data processor 60 provides a time division multiplexed signal containing the acoustic propagation delay information respective to the four acoustic transponders 10, 16. This time division multiplexed signal is transmitted by the transceiver 62 as an RF signal via a diplexer 64 and an antenna 66. The acoustic ranging interrogation signal is provided from the acoustic transducer 56 in response to the receipt of an addressed command signal by the transceiver 62 via the antenna 66; and recognition thereof by the data processor 60 as being directed to the particular buoy communcations system 20, 24.

The buoy communications system 20, 24 further includes an addressable transponder, which includes a ranging transmitter/receiver 68 for transmitting an RF buoy ranging response and identification signal in response to receipt of an RF ranging interrogation signal. The RF ranging interrogation signal is provided to the ranging transmitter/receiver 68 from the antenna 66 via the diplexer 64 and an antenna loading unit 70.

The buoy communications system 20, 24 is powered by a diesel generator 72. A power distribution and control circuit 74 is provided for centralized control and monitoring of power for the system 20, 24. A battery powered standby power supply 75 is provided also.

Figure 7:
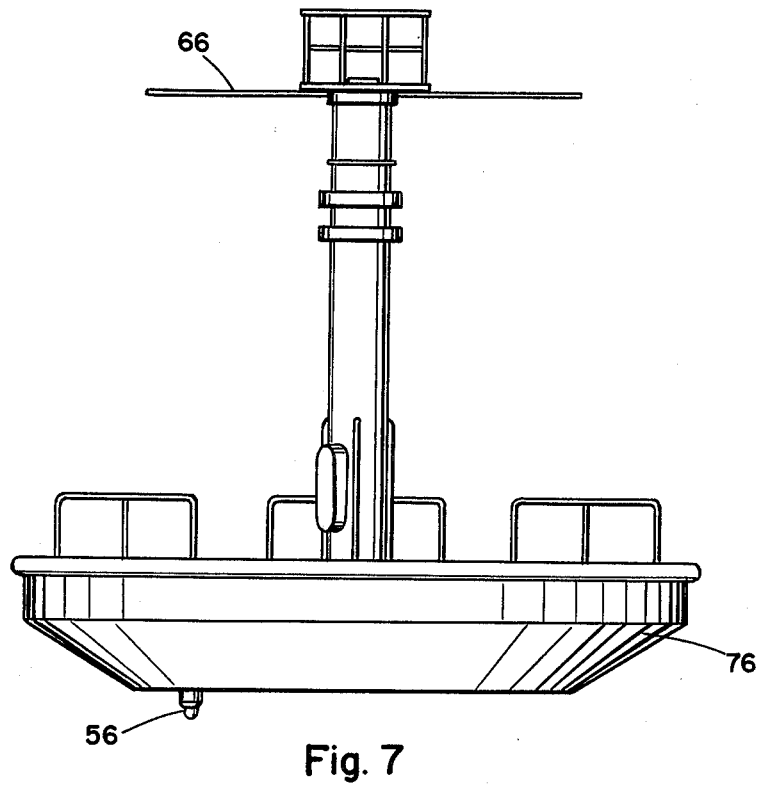
FIG. 7 is a side elevation view of a buoy containing the buoy communications system of FIG. 6.

Referring to FIG. 7, each buoy 22, 26 has a ten meter diameter and two meter deep discus-shaped hull 76. Such a shape enables the buoy 22, 26 to survive severe wind and wave conditions and provide stable support for the antenna 66. The buoy 22, 26 has adequate capacity for two diesel generators and diesel fuel capacity for long term unattended operation. The second diesel generator is a spare to facilitate changeover while at sea. The acoustic transducer 56 is installed in a standpipe that extends from the bottom of the buoy 22, 26.

Figure 8:
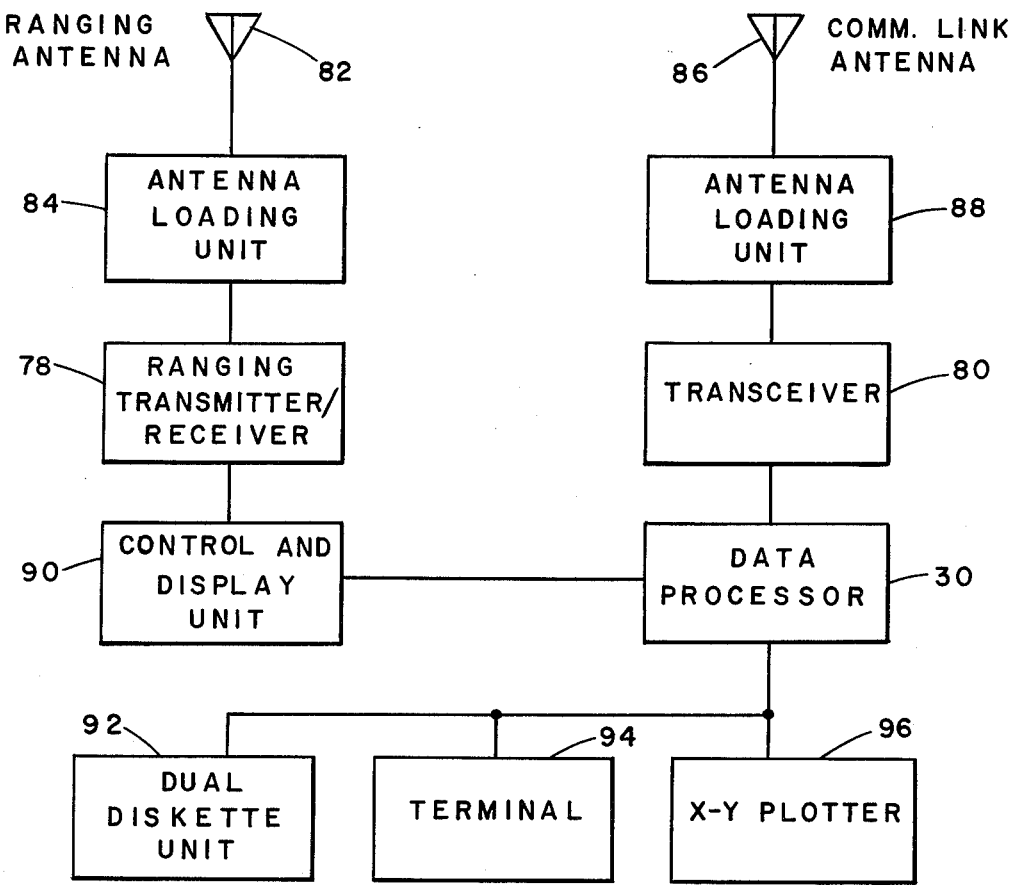
FIG. 8 is a schematic block diagram of the ship communications system in combination with the data processing system included in the system of FIG. 2.

Referring to FIG. 8, the ship communications system 28 includes a ranging transmitter/receiver 78 for transmitting the RF ranging interrogation signals to the buoy communications system 20, 24 and for receiving the RF buoy ranging response and identification signals in response thereto; and a transceiver 80 for receiving the RF signals containing the acoustic propagation delay information. This system 28 completes the surface-to-surface communications link between the buoys 22, 26 and the ship 32. A data processor 30 is included in the shipboard terminal to process the acoustic propagation delay information and to determine the buoy 22, 26 positions relative to the ocean bottom located acoustic transducers 10, 16.

There are two RF communications links between the ship 32 and each of the buoys 22, 26. One link is from the ranging transmitter/receiver 78 on board the ship 32 to the ranging transmitter/receiver 68 on each buoy 22, 26. The other link is from the transceiver 80 on board the ship 32 to the transceiver 62 on board each buoy 22, 26. The RF ranging communication link between the ranging transmitter/receiver 78 and the ranging transmitter/receivers 68 is at a specific frequency between 1.6 and 2 MHz. The command signal/acoustic propagation delay information communication link between the transceiver 80 and the transceivers 62 is in the 4 MHz band. The rated operating range is between 150 and 250 nautical miles.

The ranging transmitter/receiver 78 is coupled to a 35 foot whip-type ranging antenna 82 by means of an antenna loading unit 84; and the transceiver 80 is coupled to a 35 foot whip-type communications link antenna 86 by means of an antenna loading unit 88.

The ranging transmitter/receiver 78 is coupled to the data processor 30 by a control and display unit 90. During normal operation, the RF ranging transmitter receiver 78 automatically initiates range measurements between the ship 32 and each of the buoys 22, 26 and transfers these range data to the data processor 30. The maximum rate of range measurement to each buoy 22, 26 is once each 2 seconds. Multiple pairs of range measurements are averaged by the data processor 30 to determine the precise position of the ship 32.

The data processor 30 initiates the acoustic propagation delay information measurements, via communication of an addressed command signal from the ship transceiver 80 to a specifically addressed buoy transceiver 62. The maximum rate for acquiring the acoustic propagation delay information measurements from a buoy 22, 26 to the four transponders 10, 16 is approximately four times per minute.

Under typical environmental conditions, each buoy 22, 26 will move very slowly in its watch circle and with predictable motion for periods of many minutes, and possible hours. Often the buoy 22, 26 will take a long term "set" in one portion of the watch circle. This "set" is induced by prevailing oceanic currents and surface winds and may endure for several days. The data processor 30 reduces automatically the frequency of initiating acoustic propagation delay information measurements to extend the battery life of the acoustic transponders 10, 16 whenever buoy horizontal translation is predictably near zero.

The data processor 30 computes frequent updates of ship position, on the order of six times per minute, if required. By extrapolating ship position between updates, the real-time ship position can be provided to the display unit 90 as a continuous indication of position.

Initial operation of an over-the-horizon range measuring system may require the manual insertion of ship's position when the precision navigation system of the present invention is first activated and/or when the system operation is interrupted for considerable periods of time. This is because typical electronic distance measurement equipment characteristically provides a sometimes ambigous range indication due to the fact that its measurements are based upon phase difference measurements. Since the measured phase difference may be greater than 360° initial insertion of the ship's position is required to determine in which 360° segment the precise measurements provided by the system of the present invention are being obtained. For an interruption of a few minutes the basic ship navigation system using the ship's gyro-compass and electromagnetic log can provide position data to reinitialize the precision navigation system. For longer interruptions and when the system is first put in operation, a high quality navigation satellite fix may be necessary for initialization. The data processor 30 accepts a manual input of ship's position to initialize the RF range measuring computations, at any time.

The data processor 30 is operated in combination with a dual diskette unit 92, a data terminal 94 and an X-Y plotter 96. The data processor 30 includes a miniprocessor which computes the ship's position, utilizing both acoustic and RF ranging data and directly interfaces with the communications transceiver 80, the control and display unit 90, the data terminal 94, the X-Y plotter 96 and the dual diskette unit 92.

The data processing system 30 processes received RF signals containing acoustic propagation delay information received by the transceiver 80 and the RF signals received by the ranging transmitter/receiver 78 in relation to the RF ranging interrogation signals transmitted by the ranging transmitter/receiver 78 to determine the position of the ship 32 in relation to the first and second sets of predetermined positions 12, 18 on the ocean floor 14. The data processor 30 determines by multilateralization (a) the position of the first buoy 22 in relation to the first set of predetermined positions 12 in response to the received RF signals containing the acoustic propagation delay information respective to the first acoustic transponders 10; (b) the position of the second buoy 26 in relation to the second set of predetermined positions 18 in response to the received RF signals containing the acoustic propagation delay information respective to the second acoustic transponders 16; and (c) the position of the ship 32 in relation to the first and second buoys 22, 26 in response to the received RF buoy ranging response and identification signals received from the buoy ranging transceiver/receivers 68.

Computer programs are provided to the data processor 30 for the automatic control of the total system. Functions controlled by the computer programs includes: (1) generation of communication link check messages, origination of commands to equipment located on the buoys 22, 26 and decoding of data messages from the buoys 22, 26; (2) initial calibration of the acoustic transponder arrays associated with each buoy 22, 26; (3) determination of the position of each buoy 22, 26 within its watch circle, utilizing the initial calibration data and most current acoustic propagation delay measurement data; (4) determination of ship position with respect to the buoys 22, 26 utilizing the RF range measurement data; (5) determining ship's position in the local coordinate system by merging (3) and (4) above; (6) acceptance of manually entered ship position data as determined by other independent ship navigation systems for the purposes of; (a) relating the system local coordinates to other coordinate systems and (b) reinitializing the system after recovery from power or equipment outages, (7) monitoring of buoy and shipboard communications equipment functioning and performing limited diagnostics to verify proper system functioning, and (8) interfacing with data output and display equipment to show equipment status, system time, and ship position information.

The X-Y plotter 90 is provided to display ship-track current position and history. In addition, it provides a permanent record of the ship's track. For data interpretation purposes, the plot can be superimposed on a conventional chart of identical scale.

The dual-diskette unit 92 is used to load operational or alternate programs into the memory of the data processor 30. A special program, which is used for initial system deployment and calibrations, is provided as part of the precision navigation system.

The data terminal 94 includes a keyboard for entering data into the data processor 30 and a hard copy printer for the output of data. The keyboard is used to enter the ship's position for initialization or reinitialization of precision navigation system operation and for overall control of data processing. The hard copy printout can be used to print out the results of performance monitoring of the system or any other data that would be of interest during either normal system operation or maintenance of the system.

Ship position in latitude and longitude must be available to sufficient accuracy to allow initialization of the precision navigation system range measurement system. This requires ship position to be known to about ±1,000 feet.

The degree of geodetic precision necessary for the primary buoy mooring is dependent on various operational considerations, including claim boundaries, preferred direction for ship tracks and other factors. Obviously, the navigation system on the deployment vessel must have an accuracy consistent with the desired accuracy for geodetic location of the mining claim area.

Figure 9:
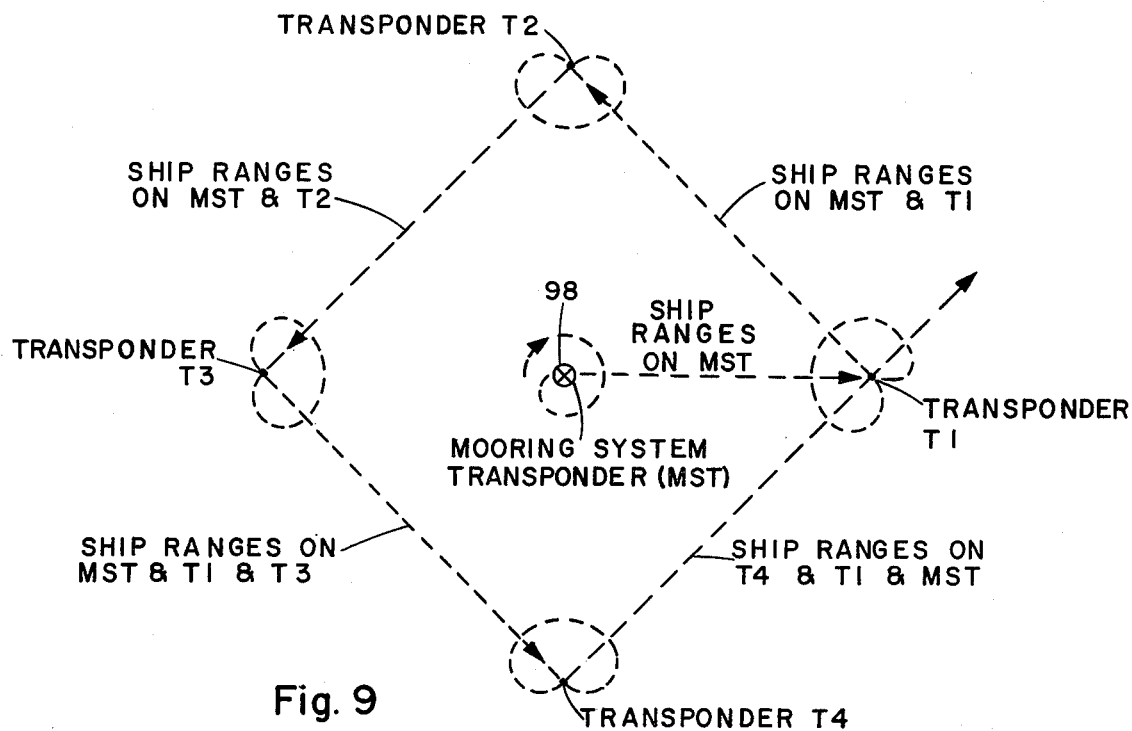
FIG. 9 illustrates the course followed by a ship in deploying the acoustic transponders on the ocean floor.

Referring to FIG. 9, each buoy is moored using a standard technique of "letting go" the anchoring clump at a predetermined location and allowing the buoy to center over the anchoring clump. At the beginning of implantment of the transponders T1, T2, T3 and T4, an acoustic addressable transponder 98 is temporarily attached to the buoy mooring anchor, thus serving as a central reference point for deployment of the other acoustic addressable transponders T1, T2, T3 and T4. The first transponder T1 is implanted by ranging "outbound" from the mooring system transponder (MST) 98 which is attached to the buoy anchor. At a range which is equivalent to 17,000 feet horizontally, the first transponder T1 is implanted. The deployment ship is then able to track on the two transponders T1, T2 following the pattern shown in FIG. 9. Subsequent transponders T3, T4 are implanted in order.

Figure 10:
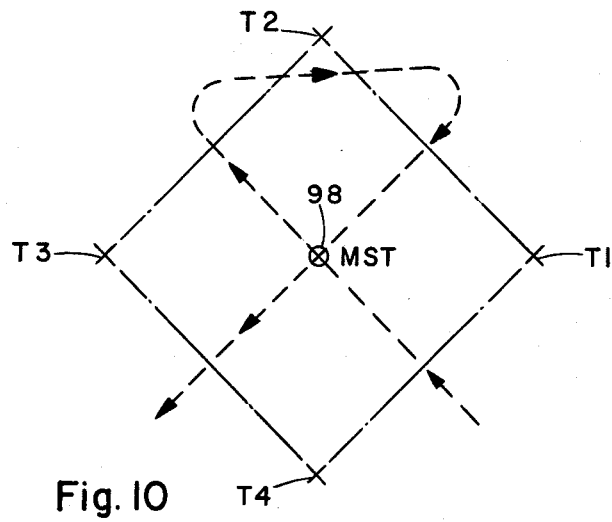
FIGS. 10 and 11 illustrate tracking patterns followed by the ship to survey in deployed transponders so as to precisely determine their location on the ocean floor.
Figure 11:
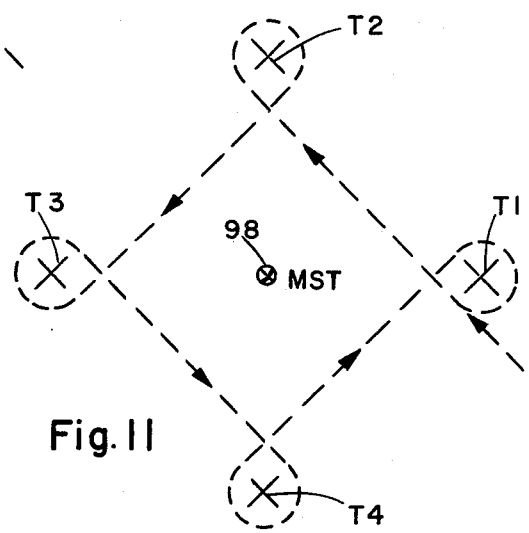

Location of the implanted array of acoustic transponders T1, T2, T3, T4 then is "surveyed in" using either a "base-line crossing" technique or a "least mean square" pattern, which are shown schematically in FIGS. 10 and 11 respectively. These data are later processed by a program on the mining ship data processor 30 to accurately determine the locations of the transponders T1, T2, T3, T4 on the ocean bottom. These locations are entered into the operational data processor 30 as part of its data base.

As a part of the location calibration of the second buoy that is deployed, it is necessary to measure accurately the range between the two buoy moorings. This is done by measuring the RF range from the first buoy to the deployment ship while the deployment ship is located over the second buoy mooring site. At the same time, the acoustic ranges are measured to relate the second buoy and the deployment ship to the original buoy mooring position. In essence, the second buoy position is measured relative to the bottom-located acoustic transponders of the first buoy. The acoustic system of the first buoy and the RF ranging system between the buoys are used in concert with ships compass data to establish the base line to the second buoy. The distance between the two buoys is also entered into the mining ship data processor 30 as part of the operational program data base.

Figure 12:
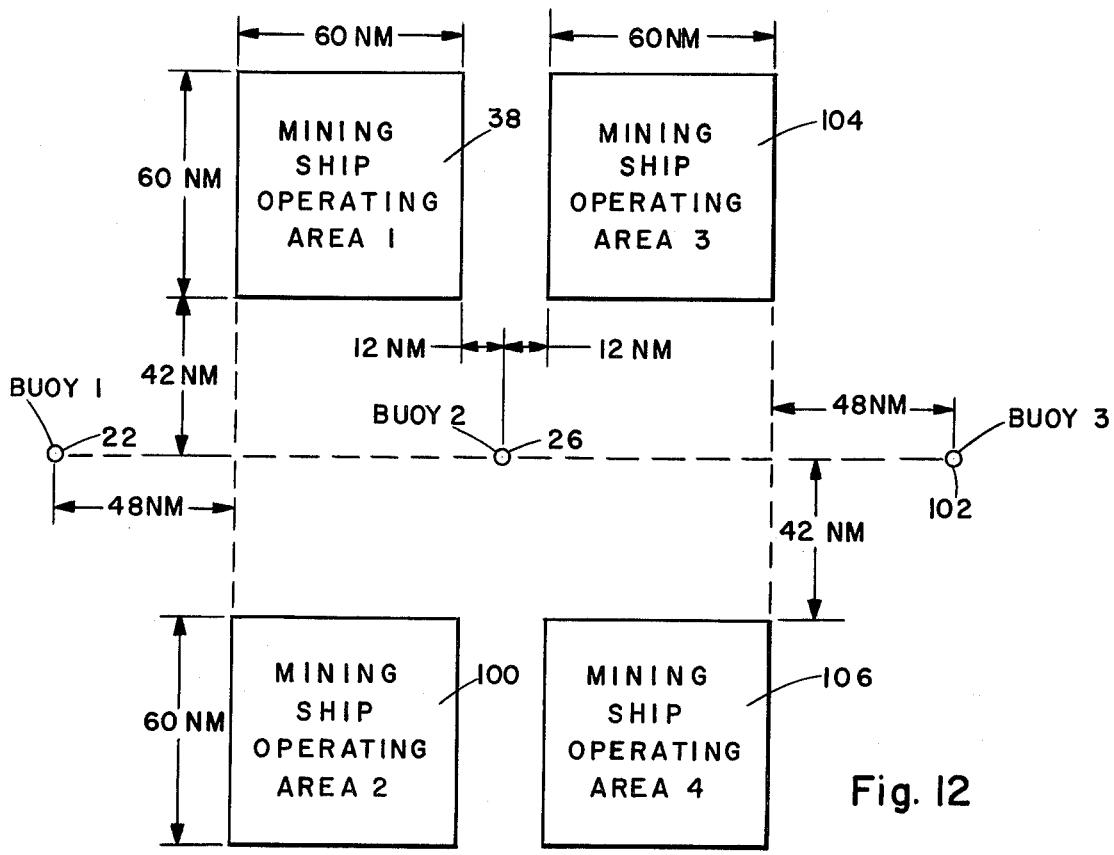
FIG. 12 illustrates the deployment of three buoys in relation to four mining ship operating areas.

With the proposed buoy configuration, it is possible to operate outside of the 60 nautical mile square operating area 38 (FIG. 4) without the ship position accuracy degrading appreciably. This could greatly expand the ship operating area without moving the buoys 22, 26. Operation within an additional 60 by 60 nautical mile operating area 100 with the same position accuracy is also available as shown in FIG. 12.

The use of additional buoys can allow one ship to operate over a larger area without moving the buoys 22, 26. As an example, addition of a third buoy 102 in line with the two buoys 22, 26 and with an equal baseline length would provide two additional 60 nautical mile operating areas 104, 106 for use by other mining ships as shown in FIG. 12.

Having described our invention, we now claim:

1. A system for determining the position of a ship in relation to predetermined positions on the ocean floor, comprising a plurality of first acoustic addressable transponders respectively located at a first set of predetermined positions on the ocean floor, wherein each of the first acoustic transponders transmits an acoustic ranging response and identification signal in response to receipt of an acoustic ranging interrogation signal;

a plurality of second acoustic addressable transponders respectively located at a second set of predetermined positions on the ocean floor, wherein each of the second acoustic transponders transmits an acoustic ranging response and identification signal in response to receipt of an acoustic ranging interrogation signal;

a first buoy communicatiions system located on a first buoy moored to the ocean floor in the vicinity of the first acoustic transponders, including a first acoustic communications device for transmitting an acoustic ranging interrogation signal to the first acoustic transponders and for receiving said acoustic ranging response and identification signals from the first acoustic transponders in response thereto, a first buoy RF communications device for transmitting RF signals containing information representative of the respective propagation delays between transmission of said acoustic ranging response and identification signals from the first acoustic transponders, and a first buoy RF addressable transponder for transmitting a first RF buoy ranging response and identification signal in response to receipt of an RF ranging interrogation signal;

a second buoy communications system located on a second buoy moored to the ocean floor in the vicinity of the second acoustic transponders, including a second acoustic communications device for transmitting an acoustic ranging interrogation signal to the second acoustic transponders and for receiving said acoustic ranging response and identification signals from the second acoustic transponders in response thereto, a second buoy RF communications device for transmitting RF signals containing information representative of the respective propagation delays between transmission of said acoustic ranging interrogation signal and receipt of said acoustic ranging response and identification signals from the second acoustic transponders, and a second buoy RF addressable transponder for transmitting a second RF buoy ranging response and identification signal in response to receipt of an RF ranging interrogation signal;

a ship communications system located on said ship for transmitting said RF ranging interrogation signals and for receiving said RF buoy ranging response and identification signals in response thereto, and for receiving said RF signals containing said acoustic propagation delay information; and a data processing system for processing said received RF signals in relation to said RF ranging interrogation signals to determine the position of said ship in relation to said first and second sets of predetermined positions on the ocean floor, including processing means for determining by multilateralization (a) the position of said first buoy in relation to said first set of predetermined positions in response to said received RF signals containing said acoustic propagation delay information respective to the first acoustic transponders, (b) the position of said second buoy in relation to said second set of predetermined positions in response to said received RF signals containing said acoustic propagation delay information respective to the second acoustic transponders, and (c) the position of said ship in relation to said first and second buoys in response to said received RF buoy ranging response and identification signals.

2. A system according to claim 1, wherein the ship communications system includes means for transmitting a command signal, and the first and second buoy communications systems each include means responsive to said command signal for transmitting said acoustic ranging interrogation signals.

3. A method for determining the position of a ship in relation to predetermined positions on the ocean floor, comprising the steps of, locating a plurality of first acoustic addressable transponders respectively at a first set of predetermined positions on the ocean floor, wherein each of the first acoustic transponders transmits an acoustic ranging response and identification signal in response to receipt of an acoustic ranging interrogation signal;

locating a plurality of second acoustic addressable transponders respectively at a second set of predetermined positions on the ocean floor, wherein each of the second acoustic transponders transmits an acoustic ranging response and identification signal in response to receipt of an acoustic ranging interrogation signal;

locating a first buoy communications system on a first buoy moored to the ocean floor in the vicinity of the first acoustic transponders, wherein the first buoy communications system includes
- a first acoustic communications device for transmitting an acoustic ranging interrogation signal to the first acoustic transponders and for receiving said acoustic ranging response and identification signals from the first acoustic transponders in response thereto,
- a first buoy RF communications device for transmitting RF signals containing information representative of the respective propagation delays between transmission of said acoustic ranging interrogation signal and receipt of said acoustic ranging response and identification signals from the first acoustic transponders, and
- a first buoy RF addressable transponder for transmitting a first RF buoy ranging response and identification signal in response to receipt of an RF ranging interrogation signal;

locating a second buoy communications system on a second buoy moored to the ocean floor in the vicinity of the second acoustic transponders, wherein the second buoy communications system includes
- a second acoustic communications device for transmitting an acoustic ranging interrogation signal to the second acoustic transponders and for receiving said acoustic ranging response and identification signals from the second acoustic transponders in response thereto,
- a second buoy RF communications device for transmitting RF signals containing information representative of the respective propagation delays between transmission of said acoustic ranging interrogation signal and receipt of said acoustic ranging response and identification signals from the second acoustic transponders, and
- a second buoy RF addressable transponder for transmitting a second RF buoy ranging response identification signal in response to receipt of an RF ranging interrogation signal;

transmitting said RF ranging interrogation signals from said ship and receiving said RF buoy ranging response and identification signals at said ship in response thereto;

receiving said RF signals containing said acoustic propagation delay information; and processing said received RF signals in relation to said RF ranging interrogation signals to determine the position of said ship in relation to said first and second sets of predetermined positions on the ocean floor, including determining by multilateration (a) the position of said first buoy in relation to said first set of predetermined positions in response to said received RF signals containing said acoustic propagation delay information respective to the first acoustic transponders, (b) the position of said second buoy in relation to said second set of predetermined positions in response to said received RF signals containing said acoustic propagation delay information respective to the second acoustic transponders, and (c) the position of said ship in relation to said first and second buoys in response to said received RF buoy ranging response, and identification signals.

4. A method according to claim 3, further comprising the step of
transmitting a command signal, and
transmitting said acoustic ranging interrogation signals from the first and second buoy communication systems in response to said command signal.

* * * * *